Feb. 21, 1961  J. FORST  2,972,341
MEANS FOR SEALING THE CYLINDER HEADS
OF INTERNAL COMBUSTION ENGINES
Filed Feb. 5, 1959
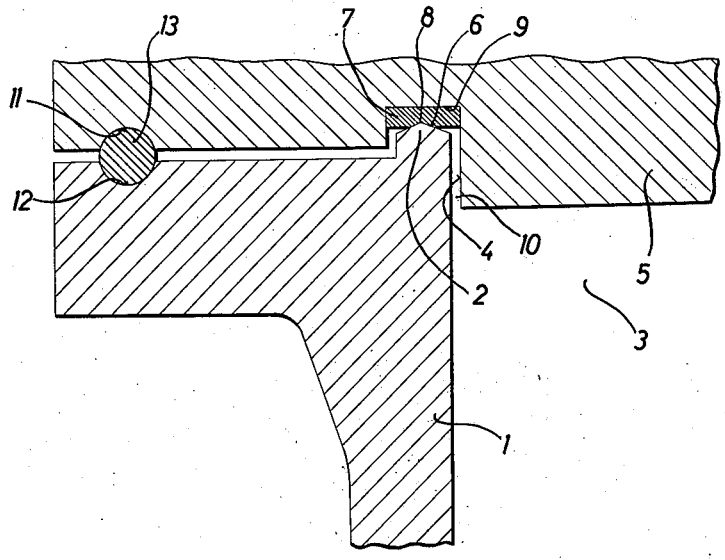
INVENTOR:
Josef Forst,
BY Singer, Stern & Carlburg
Attorneys.

United States Patent Office 2,972,341
Patented Feb. 21, 1961

2,972,341
MEANS FOR SEALING THE CYLINDER HEADS OF INTERNAL COMBUSTION ENGINES

Josef Forst, 6 Braufeldweg, Jenbach, Tyrol, Austria

Filed Feb. 5, 1959, Ser. No. 791,331

Claims priority, application Austria Feb. 19, 1958

2 Claims. (Cl. 123—41.72)

Gaskets of various types are used for sealing the cylinder heads, particularly of internal-combustion engines. Essentially, soft gaskets are known, which comprise, e.g., a metal fabric with asbestos, as well as hard metal gaskets, e.g., of copper. Whereas the soft gaskets have the advantage that they apply themselves more closely to the sealing surfaces so that they will seal even relatively uneven surfaces and that they may be applied under a relatively low pressure, these soft gaskets have the disadvantage that they are not very durable and tend to be damaged soon particularly in motors under high stress. On the other hand, metal gaskets are more durable but have the disadvantage that the sealing surfaces must be particularly carefully machined before and that the gaskets must be applied with very high pressure, which endangers the cylinder liners, which may then tear off at the collar. Besides, the known annular gaskets of metal have the disadvantage that they cannot be reused when the cylinder head is removed and reassembled if their position relative to the sealing surfaces has been changed.

This invention relates to means for sealing the cylinder heads of internal-combustion engines, comprising a metal ring for sealing against the combustion chamber and a ring of resilient material for sealing against the cooling water space. It is an object of the invention to combine the advantages of a soft gasket with those of a hard metal gasket while avoiding the disadvantages of these two types of seals. The invention resides essentially in that the mating surface has an end face which coacts with the metal ring and comprises at least one surface of revolution having generatrices which are inclined towards the cross-sectional plane of the cylinder and towards the surface of the undeformed metal ring, suitably at least one conical surface facing the centre of the cylinder. In a preferred embodiment of the invention the arrangement is such that the mating surface coacting with the metal ring is formed by a ring of the cylinder liner or of the cylinder head, which ring has a roof-shaped cross-section. As a result, the high pressure per unit area applied to the metal ring is sufficiently deformed at one edge without causing excessive forces to be exerted to the cylinder head and cylinder liner. A high pressure per unit area is achieved in conjunction with a low overall pressure. In a construction in which the metal ring lies in a groove, which received a flame-shielding collar coacting with the metal ring, the construction of the mating face coacting with the metal ring in the form of a surface of revolution having generatrices inclined towards the cross-sectional plane of the cylinder or the roof-shaped cross-section of the mating ring ensures that the metal ring is sealingly forced against the walls of the groove and fills existing interstices in the sealing system so that an absolutely tight seal is ensured.

The invention is diagrammatically explained in the drawing, which shows an illustrative embodiment in a fragmentary sectional view taken through the cylinder axis.

The cylinder liner 1 has a flame-shielding collar 2, which is opposed on the side facing the combustion chamber 3 by an annular surface 4 of the cylinder head 5. The end face 6 of the flame-shielding collar 2 coacts with a metal ring 7. This end face 6 is formed by surfaces of revolution having generatrices inclined against the cross-sectional plane of the cylinder (in the drawing the horizontal plane), more particularly by conical surfaces meeting like a roof to form in the middle a ridge 8. The metal ring is mounted in an annular groove 9 of the cylinder head so that the sloping end face 6 causes the metal ring 7 when compressed to be forced against the edges of the groove and against the surface of revolution. The penetration of the ridge 8 into the metal ring 7 and the forcing of the metal ring against the edges of the groove ensures a good seal. The annular face 4 of the cylinder head shields the metal ring 7 against the combustion gases. After a short period of operation the gap 10 is clogged with combustion residues so that the combustion gases are entirely kept away from the metal ring 7.

The seal against the cooling water is effected by a ring 13 of resilient material, such as rubber, which is inserted in grooves 11 and 12 in the cylinder head 5 and the cylinder liner 1, respectively.

What I claim is:

1. In an internal combustion engine, a cylinder, a cylinder head associated with the cylinder, said cylinder having a combustion chamber and a water cooling space surrounding said cylinder, said cylinder and cylinder head each having an end face arranged in opposed relation, sealing means between said end faces for sealing the cooling water space and combustion chamber, the sealing means for the cooling water space comprising a ring of resilient material interposed between said opposed end faces, an annular groove in one of said end faces and an annular projection on the other of said end faces adapted to be received in said annular groove and forming a sharp circular edge, and a metal ring having flat surfaces and a cross section smaller than said annular groove seated in said annular groove and adapted to be engaged and in sealing contact with said annular projection to form the sealing means for the combustion chamber, said annular projection having sloping top walls forming a circular angular portion concentric with said annular projection whereby said annular projection will engage and indent said ring and said ring will be expanded into sealing engagement with the walls of said annular groove when the cylinder head is tightened in place on said cylinder.

2. In an internal combustion engine, a cylinder, a cylinder head associated with said cylinder, said cylinder having a combustion chamber and a water cooling space surrounding said cylinder, said cylinder and cylinder head each having an end face arranged in opposed relation, sealing means between said end faces for sealing the cooling water space and combustion chamber, the sealing means for the cooling water space comprising a ring of resilient material seated in opposed grooves in said opposed end faces, an annular groove in one of said end faces and an annular projection on the other of said end faces adapted to be received in said annular groove, and a metal ring having flat surfaces and a rectangular cross section smaller than the area of the annular groove seated in said annular groove and adapted to be engaged and arranged in sealing contact with said annular projection to form the sealing means for the combustion chamber, said annular projection having an angular top surface formed by upwardly and downwardly inclined conical surfaces which intersect and form a circular projecting sharp edged ridge adapted to engage and indent said metal ring and expand the same into sealing engagement with the walls of the annular groove when the cylinder head is drawn into sealing engagement with the cylinder.

References Cited in the file of this patent

UNITED STATES PATENTS

| | | |
|---|---|---|
| 1,583,126 | Crane | May 4, 1926 |
| 1,825,774 | Boynton | Oct. 6, 1931 |
| 1,860,769 | Buchi | May 31, 1932 |
| 2,513,734 | Nardone | July 4, 1950 |
| 2,528,665 | Peterson et al. | Nov. 7, 1950 |
| 2,679,241 | Dickson | May 25, 1954 |

FOREIGN PATENTS

| | | |
|---|---|---|
| 13,090 | Netherlands | Mar. 15, 1925 |
| 248,055 | Great Britain | Feb. 24, 1926 |
| 174,505 | Austria | Apr. 10, 1953 |

OTHER REFERENCES

German application 1,044,515 printed Nov. 20, 1958 (K146c$^{17}$).